Nov. 17, 1942.  C. J. GLASSER  2,302,023
OXYGEN DELIVERY APPARATUS
Filed Sept. 6, 1941

Inventor.
Charles J. Glasser.
By Thiess, Olsen & Mecklenburger.
Attys.

Patented Nov. 17, 1942

2,302,023

UNITED STATES PATENT OFFICE 2,302,023

OXYGEN DELIVERY APPARATUS

Charles Jay Glasser, Chicago, Ill.

Application September 6, 1941, Serial No. 409,759

5 Claims. (Cl. 128—204)

This invention relates to oxygen delivery apparatus and more particularly automatic oxygen control apparatus for use in connection with aircraft for high altitude flying. The invention contemplates a complete oxygen supply system for individual use in which the device is permanently preadjusted to automatically supply a variable oxygen flow to the user and wherein the flow is proportional to the altitude and personal requirements of the user.

The invention is particularly adapted for use in connection with combat planes or the like where the attention of the pilot and crew is necessarily occupied with a complexity of instruments and controls and it is therefore desirable to reduce to a minimum the number of devices requiring personal attention.

In modern military aircraft, the possible performance now exceeds the adaptive capabilities of the average normal human being. For instance, speed has so greatly increased and maneuverability so improved that the pilot's attention cannot safely be distracted for the manual adjustment of oxygen delivery apparatus in accordance with the rapidly changing requirements of variations in altitude. Heretofore it has been necessary in devices of this kind for the user to make various adjustments of valves and the like to compensate for the variations in altitude. In the present invention as many adjustments as possible have been eliminated and all necessary adjustments are predetermined and automatically controlled in response to variations in atmospheric pressure and the oxygen requirements of the individual.

It is an object of the present invention to provide an oxygen delivery apparatus in which the oxygen supply is automatically controlled in accordance with variations in altitude and in which the oxygen is immediately available at all times by the use of any suitable gas mask or mouthpiece associated therewith.

It is also an object to provide a completely automatic pressure controlled oxygen delivery system for aircraft in which the available supply of oxygen to the individual may be automatically maintained at a predetermined substantially constant temperature irrespective of altitude.

A further object is to provide an automatic oxygen delivery apparatus which will be of few parts, cheap to manufacture, and which will not easily get out of order.

Further objects will be apparent from the specification and the appended claims.

Figures 1, 2:
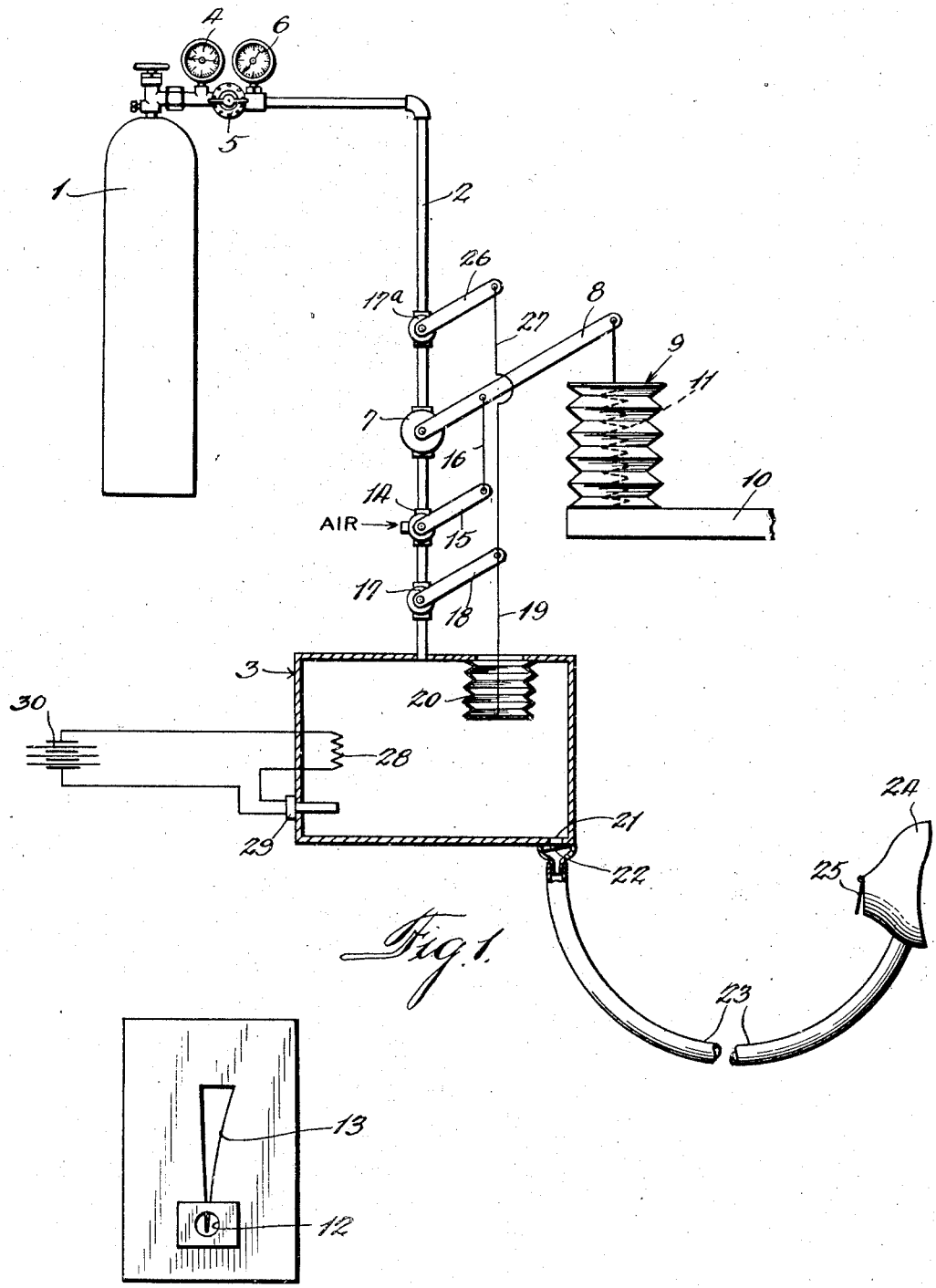
Fig. 1 is a diagrammatic view of a complete oxygen delivery apparatus illustrating one embodiment of the invention.
Fig. 2 is a diagrammatic view illustrating passage relationships suitable for progressively increasing the oxygen flow or air flow or both in accordance with altitude and oxygen percentage requirements.

Referring to the drawing in detail, the embodiment diagrammatically illustrated comprises an oxygen tank 1 which may be of the usual pressure type and arranged to deliver oxygen through a conduit 2 to a suitable mixing chamber 3. The oxygen tank conduit may be provided with the usual pressure gauge 4, a reducing valve 5, and a flow meter 6. These instruments may be of the usual type used for such purposes and associated in the usual manner and it is believed require no further description except that in the present invention the usual adjusting device for the reducing valve may be dispensed with. This is for the reason that in the present device the reducing valve is pre-set and locked in its adjusted position or a permanently fixed reducing valve is used.

The mixing chamber 3 is of a size adapted to conform with the requirements of the user or users, as the case may be, and the conduit 2 is provided with an automatically adjustable oxygen valve 7. In the embodiment illustrated, the rotor part of the valve is provided with an outwardly extending arm 8 which is connected to one end of an expansible bellows 9, the opposite end of the bellows being fixedly secured to a support 10. The bellows 9 is preferably filled with a suitable expansible gas such, for instance, as hydrogen or nitrogen, and a spring 11 is preferably provided in the bellows so that the expansion and contraction of the bellows in response to variations in pressure may be proportionate to valve operating requirements at various altitudes.

The valve 7 may be of any suitable type having a controllable passage therethrough such, for instance, as illustrated diagrammatically in Fig. 2, wherein 12 illustrates a conduit passage or opening through the valve and 13 illustrates a slot in a movable portion of the valve so that, when this slotted portion is moved downwardly, the oxygen flow through the passage 12 will be increased in a predetermined ratio and will be decreased in the same ratio when the slotted portion 13 is moved in the opposite direction. The bellows 9 is so related to the valve 7 that expansion of the bellows in response to the decreasing pressure of increasing altitudes will move the valve to increase the oxygen flow in a predetermined ratio.

In order to control the required oxygen percentage, an air valve 14 is provided in the conduit 2 between the oxygen valve 7 and the mixing chamber 3. This valve is preferably of the injector type, such as is well known in the art for supplying air to pressure oxygen outlet lines. The rotor of this air valve is provided with an arm 15 connected to the arm 8 of the oxygen valve by means of a link 16 so that the operation of the air valve is synchronized with the operation of the oxygen valve and air will be admitted in proportion to the increased or decreased oxygen flow at various altitudes.

The oxygen conduit 2 is also provided with a cut-off valve 17 adjacent the mixing tank 3 and the rotor of this cut-off valve is provided with an arm 18 connected by means of a link 19 to an expansion bellows 20 forming a part of the wall of the tank 3. The valve is so constructed and related to the expansion bellows 20 that the valve is open when the pressure in the tank 3 is below a predetermined amount and is closed when the pressure reaches the maximum necessary for normal respiratory requirements.

The mixing tank 3 is provided with an outlet 21 normally closed by means of an inspiration valve 22, this valve being normally closed by means of a spring or other resilient means so that it automatically opens and closes in synchronism with the respiration of the user. A flexible conduit 23 is connected to the outlet 21 and provided at its opposite end with a mask 24 of any suitable character having the usual respiration valve 25. The cut-off valve 17 is used in the position illustrated in order to prevent leakage through the air valve 14 from the mixing tank when the oxygen is shut off by the bellows 9.

In order to prevent leakage of oxygen from the oxygen supply through the oxygen valve 7 and the air valve 14 during the time of oxygen cut-off from the mixing chamber, an auxiliary valve 17a is positioned in the conduit 2 between the oxygen valve 7 and the oxygen tank 1. The rotor of this auxiliary valve 17a is provided with an arm 26 which arm is connected to the arm 18 of the cut-off valve 17 by means of a link 27. By this means the cut-off valves 17 and 25 operate in synchronism to simultaneously control the oxygen pressure in the mixing chamber and to prevent leakage from the air valve. By this means the pressure in the mixing chamber 3 may automatically be maintained substantially constant irrespective of respiratory requirements.

It is sometimes desirable to maintain a predetermined temperature in the mixing chamber 3 on account of the greatly reduced temperature at high altitudes. An electrical heater 28 is, therefore, mounted in the mixing chamber and connected in series with a thermostatically controlled switch 29 and a battery 30. The thermostat 29 may be of any of the usual types in which a switch is automatically operated in accordance with minute temperature changes so that the temperature in the mixing chamber may be retained substantially constant at any predetermined degree.

In the present embodiment, only a single gas mask is disclosed as connected to the mixing chamber 3. It will be apparent, however, that if desired, a plurality of masks or other suitable respiratory devices may be connected to the same chamber.

In practice, the operating characteristics of the bellows 9 and 20 are so related to the flow-controlling characteristics of the valves that the variable oxygen flow to the tank 3 will be controlled in a predetermined relationship to altitude and to the pressure in the tank 3. Also, the air flow will be controlled in a predetermined relationship to the oxygen flow. At any altitude below that at which oxygen is required, the oxygen valve 7 and air valve 14 are closed because of normal atmospheric pressure on the bellows 9. At this time, due to low pressure in the tank 3, the valves 17 and 17a are held open by the bellows 20. In moving progressively to higher altitudes, the valves 7 and 14 are gradually opened by the reduced pressure on the bellows 9, and admit oxygen and air under pressure to the tank 3. If the respiratory requirements keep the pressure in the tank 3 sufficiently low and the altitude is not materially reduced, then all of the valves remain at least partially open. If, however, the pressure in the tank 3 is sufficiently increased the valves 17 and 17a will move toward closed position and thus reduce or completely cut off the oxygen flow in a predetermined relationship to the pressure in the tank and to the outside pressure.

It is intended, of course, that the invention should not be limited to the specific embodiment or embodiments disclosed herein, since modifications may be made, and it is contemplated, therefore, by the appended claims to cover any such modifications as fall within the true spirit and scope of this invention.

Having thus described this invention, what is claimed and desired to be secured by Letters Patent is:

1. In an oxygen delivery apparatus for aircraft, an oxygen supply under pressure, a conduit from said supply terminating in a respiration controlled outlet, an oxygen flow control valve in said conduit, an air injector valve in said conduit, means connecting said valves for simultaneous control to simultaneously vary the oxygen flow and air flow, and means responsive to altitude pressure variations to operate said valves to vary the oxygen and air flow rates in a predetermined ratio to each other and to varying altitude and in accordance with predetermined respiratory requirements.

2. In an oxygen delivery apparatus for aircraft, an oxygen supply under pressure, a conduit from said supply terminating in a respiration controlled outlet, an oxygen flow control valve in said conduit, means for automatically controlling said valve to enable respiratory withdrawal of oxygen from said apparatus at a predetermined varying flow rate proportional to varying atmospheric pressure, an air injector for said conduit, and automatically operable means to control said injector synchronously with said oxygen valve to maintain a predetermined oxygen percentage irrespective of variations in atmospheric pressure.

3. An oxygen delivery apparatus of the character described comprising a tank for oxygen under pressure, an inspiratory mask or the like, a conduit for delivering oxygen to said mask, a mixing chamber forming a part of said conduit, valve means in said conduit between said supply and said mixing chamber, means controlled by variations in atmospheric pressure for automatically controlling said valve to vary the maximum flow limit of oxygen to said mixing chamber in a ratio corresponding to respiratory requirements at varying altitude, an air injector valve in said conduit between said oxygen valve means and said mixing chamber, and means to automatically vary the maximum air intake in a predetermined ratio to the variable oxygen flow.

4. An oxygen delivery apparatus of the character described comprising a tank for oxygen under pressure, an inspiratory mask or the like, a conduit for delivering oxygen to said mask, a mixing chamber forming a part of said conduit, valve means in said conduit between said supply and said mixing chamber, means controlled by variations in atmospheric pressure for automatically controlling said valve to vary the maximum flow limit of oxygen to said mixing chamber in a ratio corresponding to respiratory requirements at varying altitude, an air injector valve in said conduit between said oxygen valve means and said mixing chamber, means to automatically vary the maximum air intake in a predetermined ratio to the variable oxygen flow, a first cut-off valve in said conduit between said oxygen supply and said valve means, a second cut-off valve in said conduit between said air valve and said mixing chamber, and pressure controlled means in said chamber for simultaneously operating said cut-off valves to maintain a substantially constant predetermined pressure in said mixing chamber irrespective of oxygen withdrawal therefrom.

5. An oxygen delivery apparatus for aircraft comprising, an oxygen supply under pressure, a conduit from said oxygen supply, said conduit terminating in a respiration-controlled outlet, valve means in said conduit intermediate said supply and said outlet, means responsive to altitude pressure variations to operate said valve to enable flow of oxygen therethrough in a predetermined ratio to varying altitude, and a cutoff valve between said first valve and said oxygen supply and responsive to the altitude pressure variations and to the pressure in said conduit between said oxygen valve and said respiratory controlled outlet to cut off the oxygen supply to said oxygen valve when said pressure attains a predetermined maximum.

CHARLES JAY GLASSER.